US011710835B2

(12) United States Patent
Tamura et al.

(10) Patent No.: US 11,710,835 B2
(45) Date of Patent: Jul. 25, 2023

(54) FUEL CELL MODULE

(71) Applicant: TOYOTA JIDOSHA KABUSHIKI KAISHA, Toyota (JP)

(72) Inventors: Yuto Tamura, Toyota (JP); Tomoo Yoshizumi, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 68 days.

(21) Appl. No.: 17/572,561

(22) Filed: Jan. 10, 2022

(65) Prior Publication Data

US 2022/0263103 A1   Aug. 18, 2022

(30) Foreign Application Priority Data

Feb. 18, 2021   (JP) ................. 2021-024488

(51) Int. Cl.
  *H01M 8/026* (2016.01)
  *H01M 8/04119* (2016.01)
  *H01M 8/0254* (2016.01)

(52) U.S. Cl.
  CPC ......... *H01M 8/026* (2013.01); *H01M 8/0254* (2013.01); *H01M 8/04119* (2013.01)

(58) Field of Classification Search
  CPC . H01M 8/026; H01M 8/0254; H01M 8/04119
  USPC ....................................... 429/457
  See application file for complete search history.

(56) References Cited

U.S. PATENT DOCUMENTS

| 2012/0038373 | A1* | 2/2012 | Ikeda ............... | H01M 8/04641 |
| | | | | 324/649 |
| 2018/0166728 | A1* | 6/2018 | Hayashi ............. | H01M 8/0258 |
| 2018/0183087 | A1 | 6/2018 | Kanno et al. | |
| 2018/0277878 | A1* | 9/2018 | Kanno ............... | H01M 8/0258 |
| 2019/0334183 | A1* | 10/2019 | Ebato ................ | H01M 8/2475 |
| 2020/0295384 | A1* | 9/2020 | Inoue ................ | H01M 8/0273 |

FOREIGN PATENT DOCUMENTS

JP   2018107071 A   7/2018

* cited by examiner

*Primary Examiner* — James M Erwin
(74) *Attorney, Agent, or Firm* — Hunton Andrews Kurth LLP

(57) ABSTRACT

A fuel cell module includes a stack including a plurality of fuel cells stacked together, at least one dummy cell in contact with the stack at an end portion of the stack in a stacking direction, a reactant gas supply path configured to supply a reactant gas that is either a fuel gas or an oxidant gas to the fuel cells and the dummy cell, and a reactant gas discharge path in communication with the fuel cells and the dummy cell. The fuel cells and the dummy cell each include a reactant gas flow path configured to cause the reactant gas from the reactant gas supply path to flow toward the reactant gas discharge path. Pressure loss of the reactant gas flow path of the dummy cell is smaller than pressure loss of the reactant gas flow path of the fuel cells.

6 Claims, 8 Drawing Sheets

FUEL CELL MODULE

CROSS-REFERENCE TO RELATED APPLICATION

This application claims priority to Japanese Patent Application No. 2021-024488 filed on Feb. 18, 2021, incorporated herein by reference in its entirety.

BACKGROUND

1. Technical Field

The technology disclosed in the present specification relates to a fuel cell module.

2. Description of Related Art

A fuel cell module disclosed in Japanese Unexamined Patent Application Publication No. 2018-107071 (JP 2018-107071 A) includes a stack of fuel cells and a dummy cell in contact with an end portion of the stack. A reactant gas supply path is in communication with the fuel cells and the dummy cell. A reactant gas (e.g., anode gas) is supplied from the reactant gas supply path to the fuel cells and the dummy cell. Electricity is generated by reaction of the reactant gas inside the fuel cells.

SUMMARY

In the fuel cell module according to JP 2018-107071 A, there are cases in which a liquid is formed in the reactant gas supply path. For example, when acceleration is applied to the fuel cell module, water may flow into the reactant gas supply path from a device upstream of the reactant gas supply path. Also, for example, when the fuel cell module is exposed to a low temperature environment for long periods of time, liquid water may be formed by condensation occurring in the reactant gas supply path. When liquid flows into the fuel cell from the reactant gas supply path, the reactant gas flow path inside the fuel cell becomes blocked by the liquid, and the fuel cell cannot generate electricity properly. As a result, the electricity generation efficiency of the fuel cell module deteriorates. The present specification proposes a fuel cell module in which liquid does not easily flow into the fuel cell from the reactant gas supply path.

A fuel cell module according to an aspect of the present specification includes a stack including a plurality of fuel cells stacked together, at least one dummy cell in contact with the stack at an end portion of the stack in a stacking direction, a reactant gas supply path configured to supply a reactant gas that is either a fuel gas or an oxidant gas to the fuel cells and the dummy cell, and a reactant gas discharge path in communication with the fuel cells and the dummy cell. The fuel cells and the dummy cell each include a reactant gas flow path configured to cause the reactant gas from the reactant gas supply path to flow toward the reactant gas discharge path. Pressure loss of the reactant gas flow path of the dummy cell is smaller than pressure loss of the reactant gas flow path of the fuel cells.

In this fuel cell module, the pressure loss in the reactant gas flow path of the dummy cell is smaller than the pressure loss in the reactant gas flow path of the fuel cells. Accordingly, the flow rate of the reactant gas flowing from the reactant gas supply path into the reactant gas flow path of the dummy cell is greater than the flow rate of the reactant gas flowing from the reactant gas supply path into the reactant gas flow path of the fuel cells. When a liquid is present in the reactant gas supply path, the liquid will be carried downstream by the reactant gas. The flow rate of the reactant gas flowing into the reactant gas flow path of the dummy cell is greater than the flow rate of the reactant gas flowing into the reactant gas flow path of the fuel cells, and accordingly the greater part of the liquid present in the reactant gas supply path flows into the reactant gas flow path of the dummy cell. Thus, the inflow of liquid into the reactant gas flow path of the fuel cells is suppressed. In this way, liquid does not readily flow into the fuel cell in this fuel cell module.

In the above fuel cell module, the dummy cell may include a first separator, a second separator, and a spacer that has aeration properties and that is interposed between the first separator and the second separator. The spacer may be part of the reactant gas flow path of the dummy cell.

According to this configuration, the pressure loss in the reactant gas flow path of the dummy cell can be reduced.

In the above fuel cell module, the fuel cells may each include a third separator, a fourth separator, and a membrane electrode assembly interposed between the third separator and the fourth separator. The membrane electrode assembly may include a gas diffusion layer that has aeration properties. The gas diffusion layer may be part of the reactant gas flow path of the fuel cells. An air permeance of the spacer may be higher than an air permeance of the gas diffusion layer.

According to this configuration, the pressure loss in the reactant gas flow path of the dummy cell can be reduced.

In the above fuel cell module, a sectional area of the reactant gas flow path of the dummy cell may be greater than a sectional area of the reactant gas flow path of the fuel cells.

In the above fuel cell module, a thickness of the spacer may be greater than a thickness of the gas diffusion layer.

In the above fuel cell module, a groove may be provided on a surface of each of the first separator, the second separator, the third separator, and the fourth separator. In the dummy cell, the reactant gas flow path may be configured by the groove and the spacer. In the fuel cells, the reactant gas flow path may be configured by the groove and the gas diffusion layer. A depth of the groove of the dummy cell may be deeper than a depth of the groove of the fuel cells.

BRIEF DESCRIPTION OF THE DRAWINGS

Features, advantages, and technical and industrial significance of exemplary embodiments of the present disclosure will be described below with reference to the accompanying drawings, in which like signs denote like elements, and wherein.

DETAILED DESCRIPTION OF EMBODIMENTS

Figure 1:
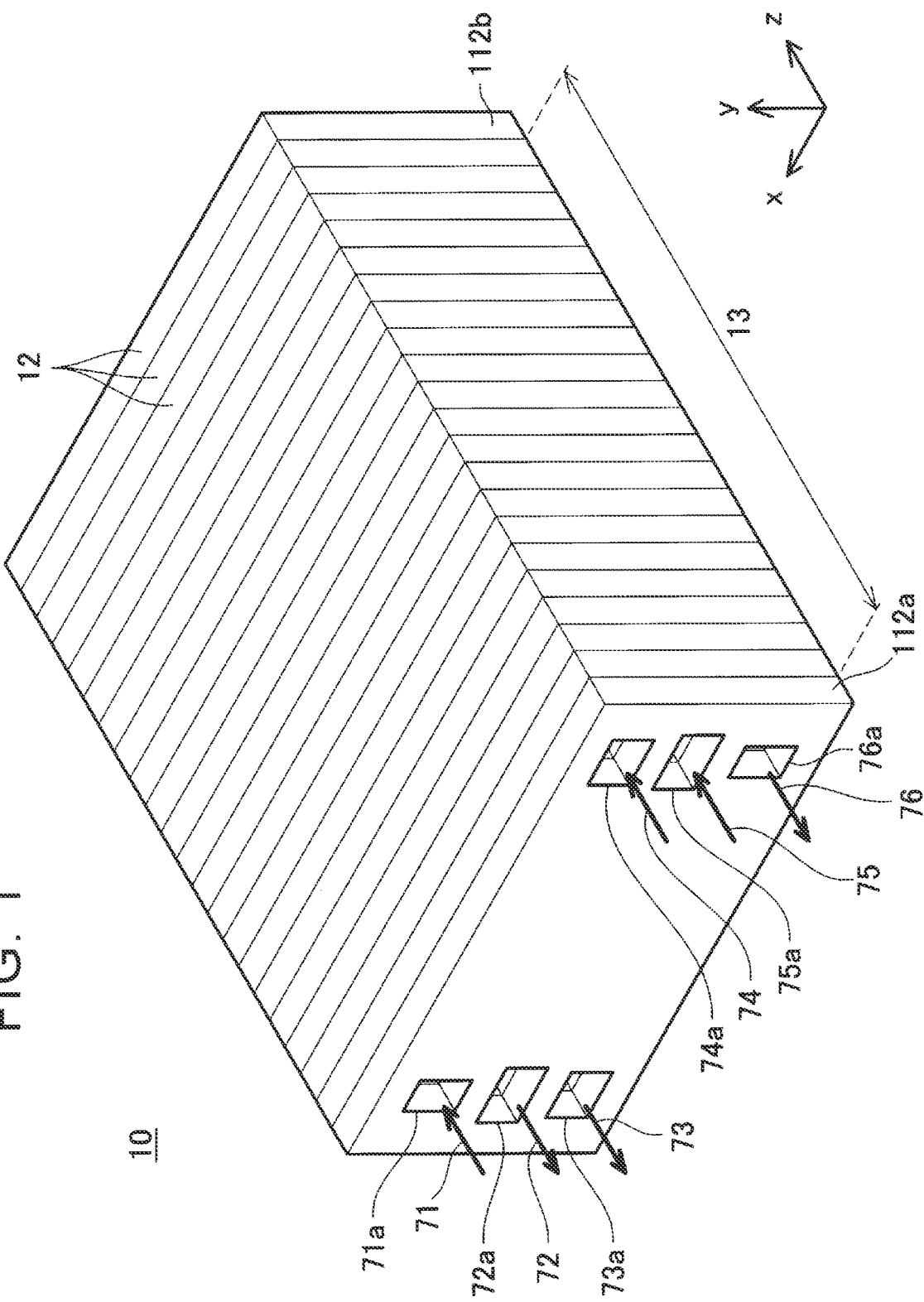
FIG. 1 is a perspective view of a fuel cell module 10.

A fuel cell module 10 illustrated in FIG. 1 is installed in a fuel cell vehicle. The fuel cell module 10 includes a plurality of fuel cells 12 and two dummy cells 112 (i.e., dummy cells 112a and 112b). The fuel cells 12 and the dummy cells 112 have a plate-like forms. The fuel cells 12 are stacked together in a thickness direction. In each of the drawings including FIG. 1, the direction in which the fuel cells 12 are stacked is shown as the z direction, one direction orthogonal to the z direction is shown as the x direction, and the direction orthogonal to the x direction and the z direction is shown as the y direction. The dummy cells 112 are disposed on respective sides of a stack 13 of the fuel cells 12. The dummy cell 112a is in contact with the stack 13 at one end portion in the z direction (i.e., the fuel cell 12 at that end portion). The dummy cell 112b is in contact with the stack 13 at the other end portion in the z direction (i.e., the fuel cell 12 at that end portion).

Figure 2:
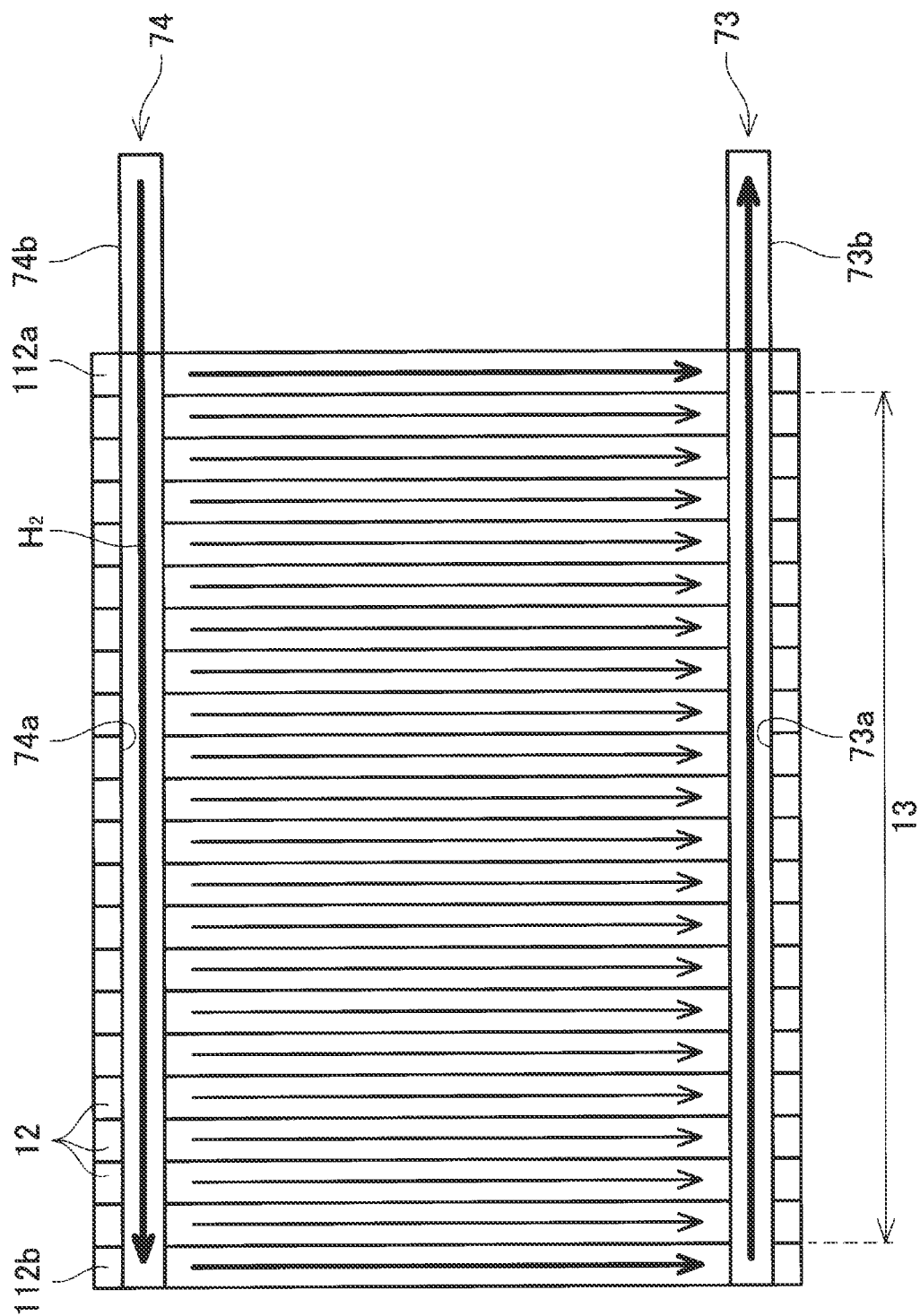
FIG. 2 is a simplified sectional view of the fuel cell module 10.

As illustrated in FIGS. 1 and 2, through holes 73a and 74a are provided in each fuel cell 12 and each dummy cell 112. As illustrated in FIG. 2, the through holes 74a are connected to each other. A pipe 74b is in communication with the through hole 74a of the dummy cell 112a. A fuel gas supply path 74 is formed by the through holes 74a and the pipe 74b. As illustrated in FIG. 2, the through holes 73a are connected to each other. A pipe 73b is in communication with the through hole 73a of the dummy cell 112a. A fuel gas discharge path 73 is formed by the through holes 73a and the pipe 73b. Fuel gas (hydrogen ($H_2$) in the present embodiment) is supplied to the fuel cells 12 and the dummy cells 112 through the fuel gas supply path 74. The fuel gas that has passed through the fuel cells 12 and the dummy cells 112 is discharged to the outside of the fuel cell module 10 through the fuel gas discharge path 73.

As illustrated in FIG. 1, through holes 71a and 76a are provided in each fuel cell 12 and each dummy cell 112. The through holes 71a are connected to each other in the same way as with the through holes 74a, although this is omitted from illustration. A pipe is in communication with the through hole 71a of the dummy cell 112a, although this is omitted from illustration. An oxidant gas supply path 71 is formed by the through holes 71a and the pipe. The through holes 76a are connected to each other in the same way as with the through holes 74a, although this is omitted from illustration. A pipe is in communication with the through hole 76a of the dummy cell 112a, although this is omitted from illustration. An oxidant gas discharge path 76 is formed by the through holes 76a and the pipe. Oxidant gas (oxygen ($O_2$) in the present embodiment) is supplied to the fuel cells 12 and the dummy cells 112 through the oxidant gas supply path 71. The oxidant gas that has passed through the fuel cells 12 and the dummy cells 112 is discharged to the outside of the fuel cell module 10 through the oxidant gas discharge path 76.

As illustrated in FIG. 1, through holes 72a and 75a are provided in each fuel cell 12 and each dummy cell 112. The through holes 75a are connected to each other in the same way as with the through holes 74a, although this is omitted from illustration. A pipe is in communication with the through hole 75a of the dummy cell 112a, although this is omitted from illustration. A refrigerant supply path 75 is formed by the through holes 75a and a pipe. The through holes 72a are connected to each other in the same way as with the through holes 74a, although this is omitted from illustration. A pipe is in communication with the through hole 72a of the dummy cell 112a, although this is omitted from illustration. A refrigerant discharge path 72 is formed by the through holes 72a and a pipe. Refrigerant is supplied to the fuel cells 12 and the dummy cells 112 through the refrigerant supply path 75. The refrigerant that has passed through the fuel cells 12 and the dummy cells 112 is discharged to the outside of the fuel cell module 10 through the refrigerant discharge path 72. The fuel cells 12 are cooled by the refrigerant flowing through the fuel cell module 10.

Figure 3:
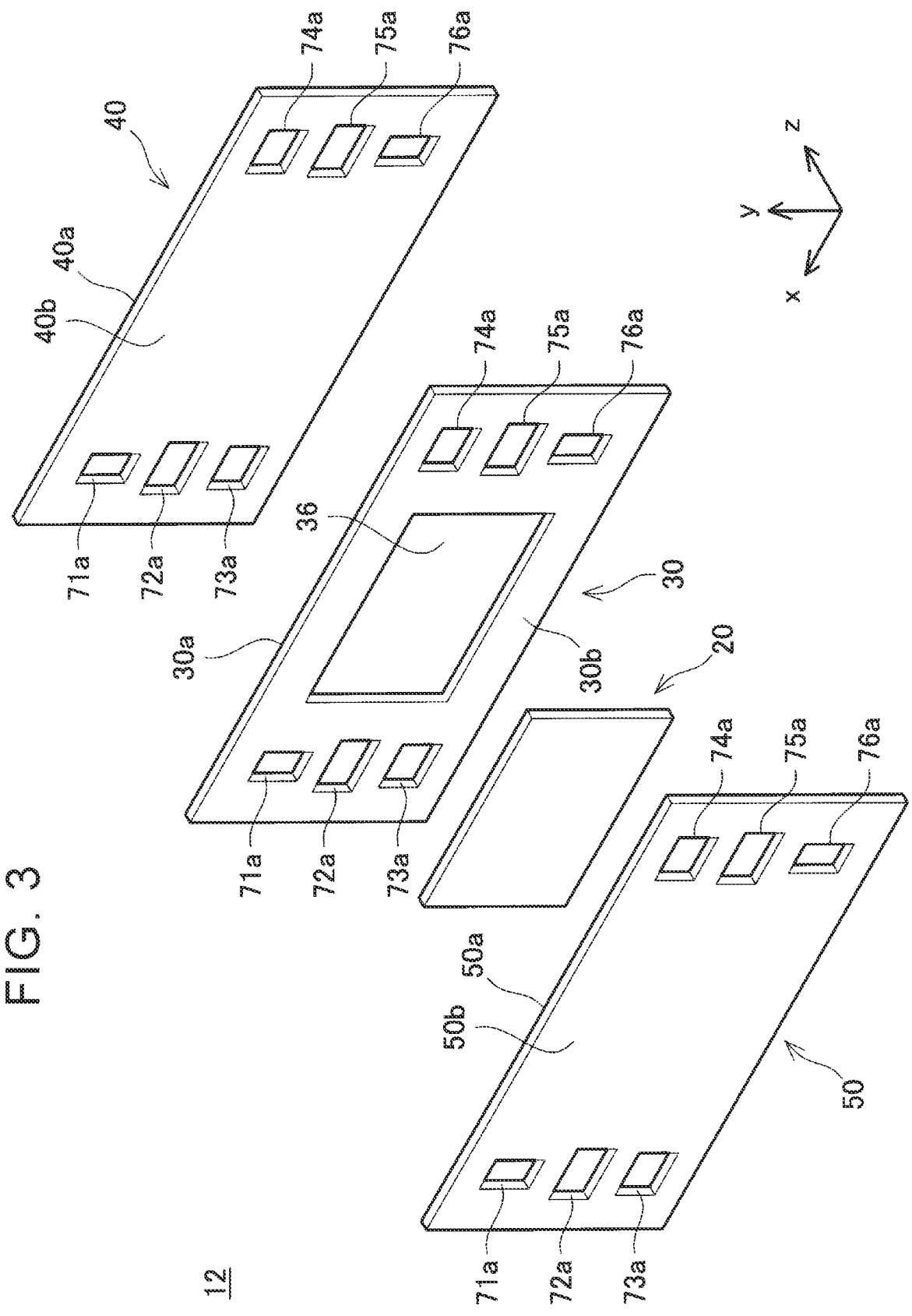
FIG. 3 is a disassembled perspective view of a fuel cell 12.

FIG. 3 is a disassembled perspective view of one fuel cell 12. As illustrated in FIG. 3, the fuel cell 12 has a membrane electrode assembly (hereinafter referred to as "MEA") 20, a resin frame 30, a separator 40, and a separator 50. Each of the resin frame 30, the separator 40, and the separator 50 has a rectangular plate shape that is long in the x direction. The resin frame 30, the separator 40, and the separator 50 are layered in the z direction. Hereinafter, the surface of the resin frame 30 closer to the separator 40 will be referred to as "surface 30a", and the surface of the resin frame 30 on the opposite side thereof will be referred to as "surface 30b". Also hereinafter, the surface of the separator 40 closer to the resin frame 30 will be referred to as "surface 40b", and the surface of the separator 40 on the opposite side thereof will be referred to as "surface 40a". Also hereinafter, the surface of the separator 50 closer to the resin frame 30 will be referred to as "surface 50a", and the surface of the separator 50 on the opposite side thereof will be referred to as "surface 50b". The resin frame 30 is configured of an insulating resin. A through hole 36 that passes through the resin frame 30 in the z direction is provided in the center of the resin frame 30. The MEA 20 is disposed in the through hole 36. The separator 40 is a metal plate member. The surface 40b of the separator 40 is bonded to the surface 30a of the resin frame 30. The through hole 36 is covered by the separator 40. The separator 50 is a metal plate member. The surface 50a of the separator 50 is bonded to the surface 30b of the resin frame 30. The through hole 36 is covered by the separator 50. Thus, the resin frame 30 is sandwiched between the separator 40 and the separator 50. The resin frame 30, the separator 40, and the separator 50 are each provided with the above-mentioned through holes 71a through 76a.

Figure 4:
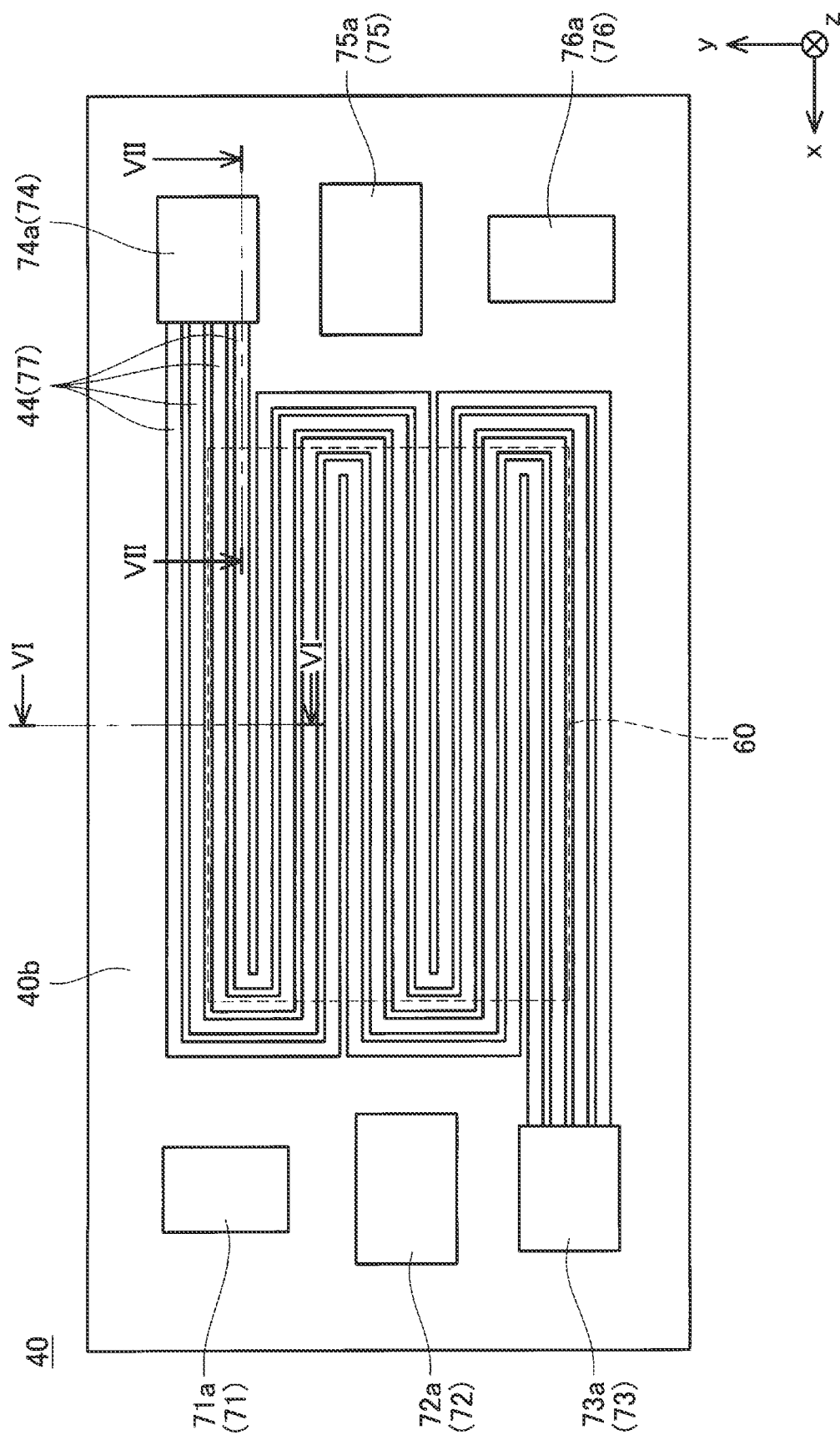
FIG. 4 is a plan view of a separator 40.
Figure 6:
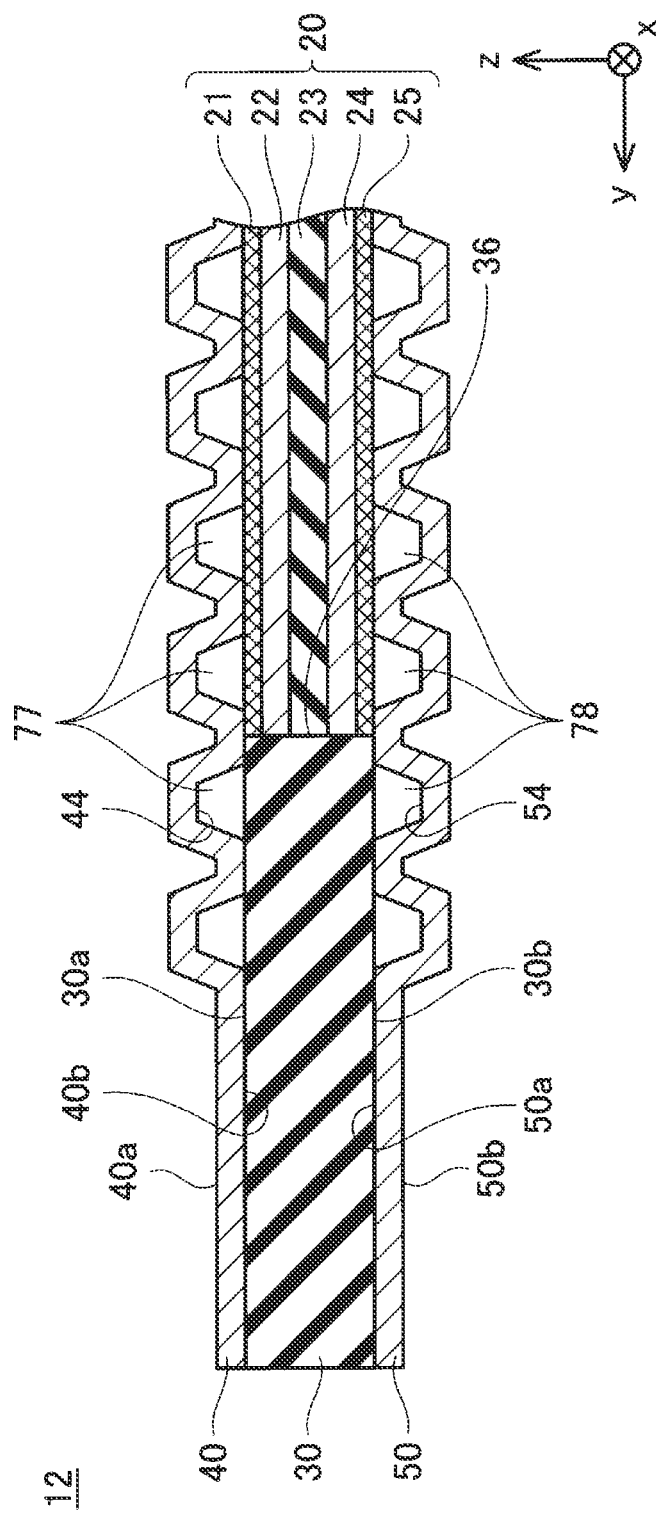
FIG. 6 is a sectional view of the fuel cell 12 taken at the position of line VI-VI in FIGS. 4 and 5.
Figure 7:
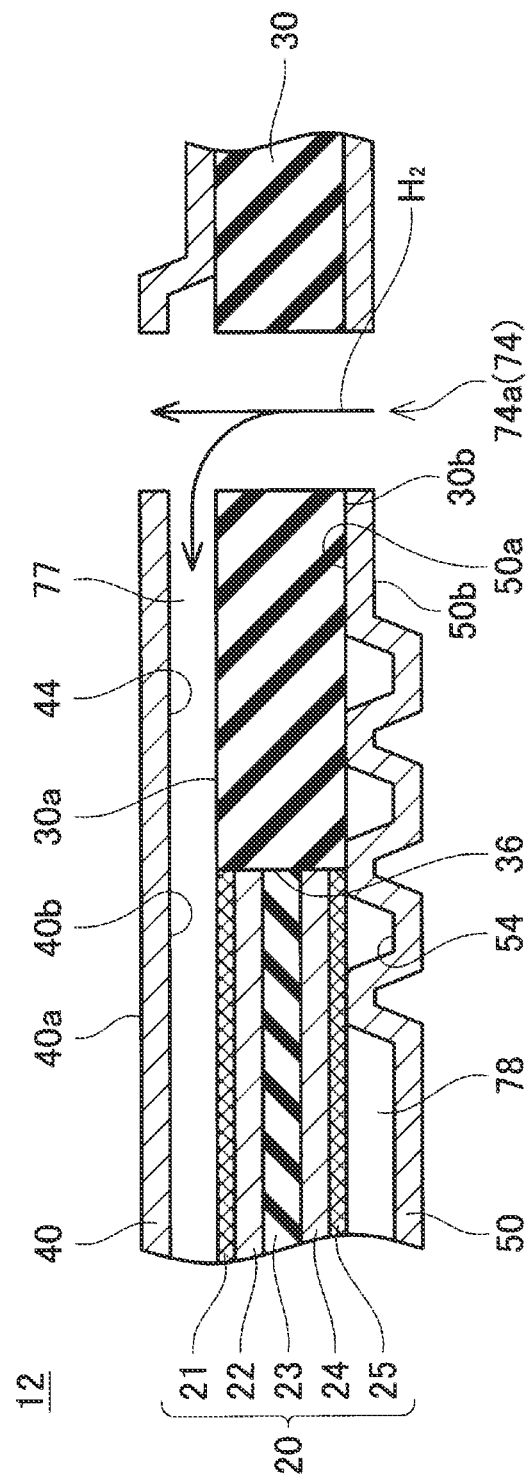
FIG. 7 is a sectional view of the fuel cell 12 taken at the position of line VII-VII in FIGS. 4 and 5.

As illustrated in FIGS. 4, 6 and 7, a part of the separator 40 is corrugated, with grooves 44 being provided thereby on the surface 40b of the separator 40. The grooves 44 extend from the through hole 74a to the through hole 73a. A range 60 in FIG. 4 indicates a range over which the separator 40 faces the MEA 20 (a range over which the separator 40 overlaps the MEA 20 when viewed along the z direction). The grooves 44 extend meandering within the range 60. As illustrated in FIGS. 6 and 7, the surface 40b of the separator 40 is in contact with the resin frame 30 and the MEA 20 at a portion other than the grooves 44. Fuel gas flow paths 77 are configured in spaces surrounded by the grooves 44 and the resin frame 30, and the grooves 44 and the MEA 20. As illustrated in FIG. 4, an upstream end of the fuel gas flow paths 77 is in communication with the fuel gas supply path 74, and a downstream end of the fuel gas flow paths 77 is in communication with the fuel gas discharge path 73.

Figure 5:
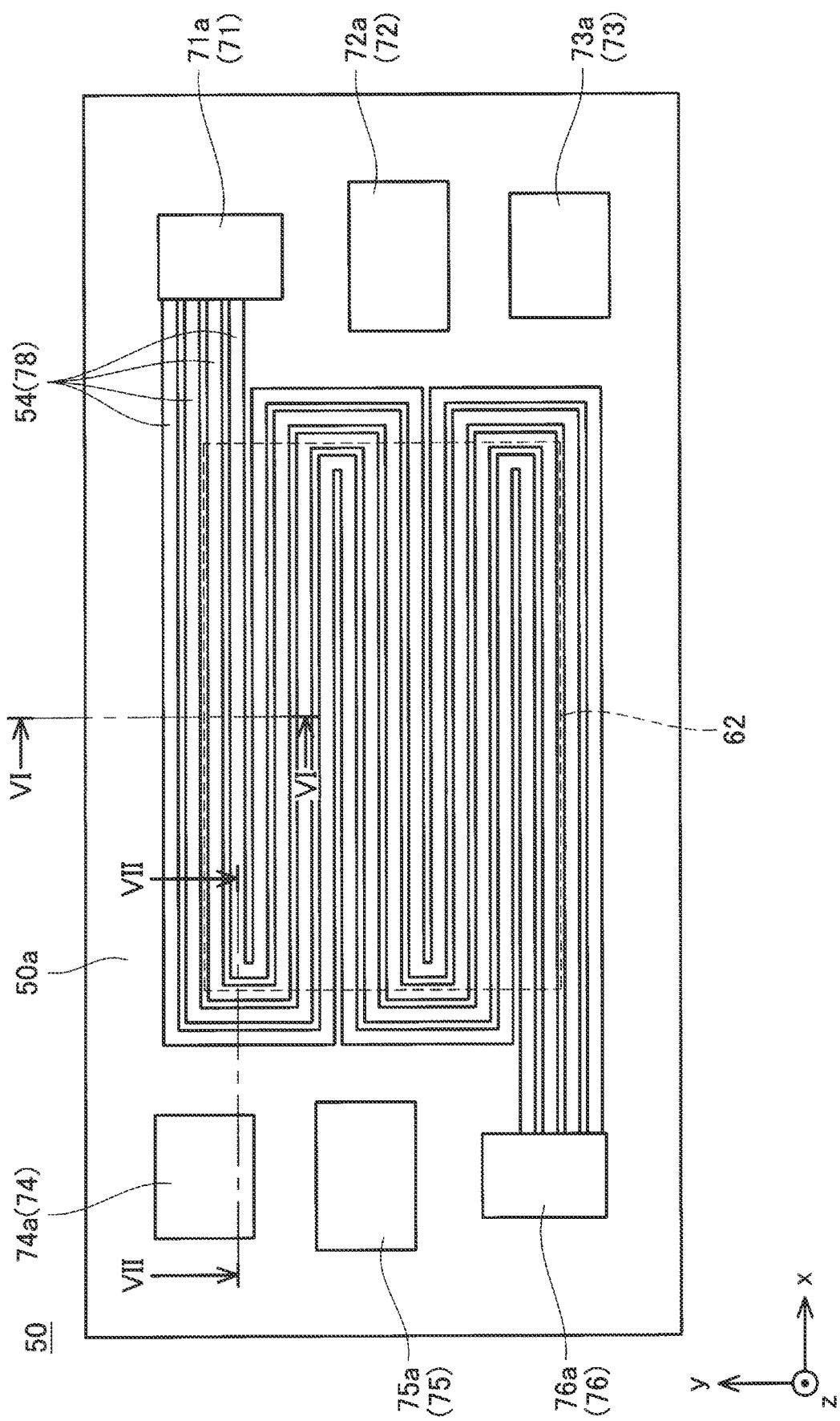
FIG. 5 is a plan view of a separator 50.

As illustrated in FIGS. 5 through 7, a part of the separator 50 is corrugated, with grooves 54 being provided thereby on the surface 50a of the separator 50. The grooves 54 extend from the through hole 71a to the through hole 76a. A range 62 in FIG. 5 indicates a range over which the separator 50 faces the MEA 20 (a range over which the separator 50 overlaps the MEA 20 when viewed along the z direction). The grooves 54 extend meandering within the range 62. As illustrated in FIGS. 6 and 7, the surface 50a of the separator 50 is in contact with the resin frame 30 and the MEA 20 at a portion other than the grooves 54. Oxidant gas flow paths 78 are configured in spaces surrounded by the grooves 54 and the resin frame 30, and the grooves 54 and the MEA 20.

An upstream end of the oxidant gas flow path 78 is in communication with the oxidant gas supply path 71, and a downstream end of the oxidant gas flow path 78 is in communication with the oxidant gas discharge path 76.

As illustrated in FIGS. 6 and 7, the MEA 20 has a gas diffusion layer 21 (hereinafter referred to as "GDL"), an anode layer 22, an electrolyte membrane 23, a cathode layer 24, and a GDL 25. The electrolyte membrane 23 is configured of a solid polymer electrolyte material. The anode layer 22 and the cathode layer 24 are configured of a material in which conductive particles containing a catalyst such as platinum are diffused in an electrolyte or the like. The anode layer 22 covers the surface of the electrolyte membrane 23 on the side close to the separator 40. The cathode layer 24 covers the surface of the electrolyte membrane 23 on the side close to the separator 50. The GDLs 21 and 25 are configured of a conductive porous material (e.g., carbon cloth). The GDL 21 covers the surface of the anode layer 22 on the side close to the separator 40. The GDL 21 is in contact with the surface 40b of the separator 40. The GDL 25 covers the surface of the cathode layer 24 on the side closer to the separator 50. The GDL 25 is in contact with the surface 50a of the separator 50.

Figure 8:
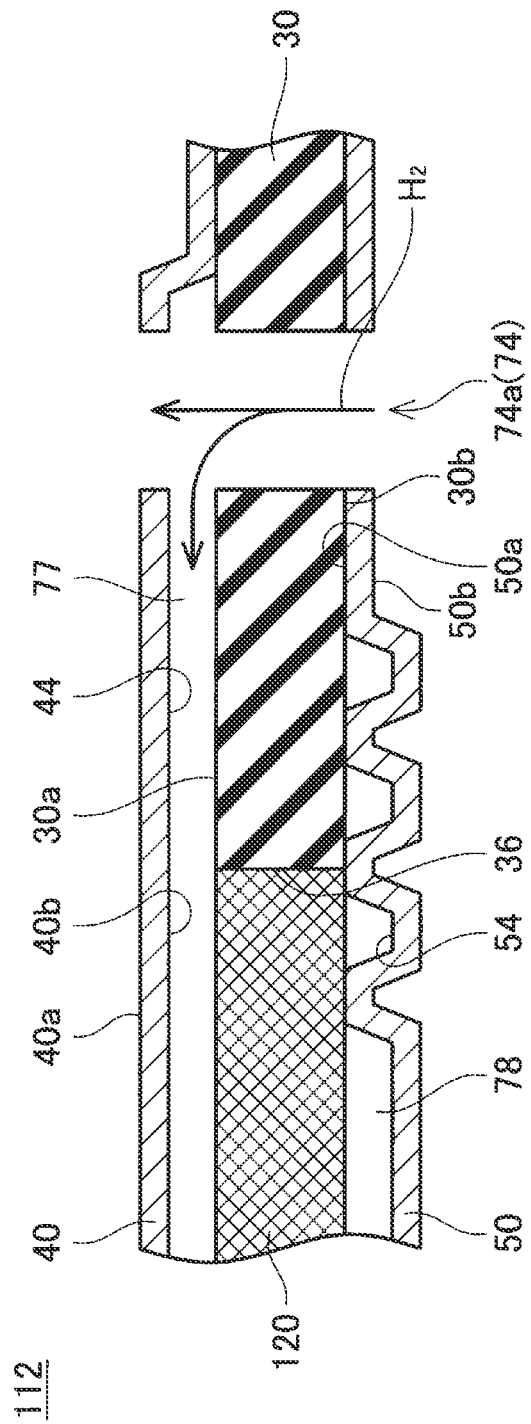
FIG. 8 is a sectional view of a dummy cell 112 at the position corresponding to FIG. 7.

As illustrated in FIG. 8, the dummy cell 112 has a resin frame 30, a separator 40, and a separator 50, in the same way as with the fuel cell 12. The configuration of the resin frame 30, the separator 40, and the separator 50 of the dummy cell 112 is the same as the configuration of the resin frame 30, the separator 40, and the separator 50 of the fuel cell 12. Also, the dummy cell 112 includes a spacer 120. The spacer 120 is disposed in the through hole 36 of the resin frame 30. That is to say, the dummy cell 112 is an arrangement in which the MEA 20 of the fuel cell 12 has been replaced by the spacer 120. The spacer 120 is configured of a conductive porous material (e.g., carbon cloth). The air permeance of the spacer 120 is higher than the air permeance of the GDLs 21 and 25. As with the MEA 20, the spacer 120 is in contact with the surface 40b of the separator 40 at positions other than the grooves 44. Fuel gas flow paths 77 are configured in spaces surrounded by the grooves 44 and the resin frame 30, and the grooves 44 and the spacer 120. As with the MEA 20, the spacer 120 is in contact with the surface 50a of the separator 50 at positions other than the grooves 54. Oxidant gas flow paths 78 are configured in spaces surrounded by the grooves 54 and the resin frame 30, and the grooves 54 and the spacer 120.

When operating the fuel cells 12, the fuel gas is passed through the fuel gas supply path 74, and the oxidant gas is passed through the oxidant gas supply path 71. The fuel gas in the fuel gas supply path 74 (i.e., the through holes 74a) flows into the fuel gas flow paths 77 of the fuel cells 12, as indicated by arrows in FIG. 7. The fuel gas flows through the fuel gas flow paths 77 of the fuel cells 12 from the upstream end to the downstream end, and then is discharged to the fuel gas discharge path 73 (i.e., the through holes 73a). Further, the oxidant gas in the oxidant gas supply path 71 (i.e., the through holes 71a) flows into the oxidant gas flow paths 78 of the fuel cells 12. The oxidant gas flows through the oxidant gas flow paths 78 of the fuel cells 12 from the upstream end to the downstream end, and then is discharged to the oxidant gas discharge path 76 (i.e., the through holes 76a). Thus, in the fuel cells 12, the fuel gas flows through the fuel gas flow paths 77, and the oxidant gas flows through the oxidant gas flow paths 78. Accordingly, the fuel gas and the oxidant gas are supplied to the MEA 20, and electricity is generated at the MEA 20. As a result, a voltage is generated between both end portions of the fuel cell module 10 in the stacking direction.

The fuel gas and the oxidant gas also flow into the dummy cells 112. That is to say, the fuel gas in the fuel gas supply path 74 (i.e., the through holes 74a) flows into the fuel gas flow paths 77 of the dummy cells 112, as indicated by arrows in FIG. 8. The fuel gas flows through the fuel gas flow paths 77 of the dummy cells 112 from the upstream end to the downstream end, and then is discharged to the fuel gas discharge path 73 (i.e., the through holes 73a). Also, the oxidant gas in the oxidant gas supply path 71 (i.e., the through holes 71a) flows into the oxidant gas flow paths 78 of the dummy cells 112. The oxidant gas flows through the oxidant gas flow paths 78 of the dummy cells 112 from the upstream end to the downstream end, and then is discharged to the oxidant gas discharge path 76 (i.e., the through holes 76a). No MEA is disposed in the dummy cells 112, and accordingly no electricity is generated in the dummy cells 112.

The GDL 21 has aeration properties, and accordingly part of the fuel gas flowing through the fuel gas flow paths 77 of the fuel cells 12 flows through the GDL 21. That is to say, the GDL 21 constitutes part of the fuel gas flow paths 77. Also, the spacer 120 has aeration properties, and accordingly part of the fuel gas flowing through the fuel gas flow paths 77 of the dummy cells 112 flows through the spacer 120. That is to say, the spacer 120 constitutes part of the fuel gas flow paths 77. As described above, the air permeance of the spacer 120 is higher than the air permeance of the GDL 21. Further, the thickness of the spacer 120 is thicker than that of the GDL 21, which is clear from FIGS. 7 and 8. Accordingly, the sectional area of the fuel gas flow paths 77 of the dummy cells 112 (more specifically, the sectional area of the fuel gas flow paths 77 of the portion provided with the spacer 120) is greater than the sectional area of the fuel gas flow paths 77 of the fuel cells 12 (more specifically, the sectional area of the fuel gas flow paths 77 of the portion provided with the GDL 21). Therefore, the pressure loss that occurs when the fuel gas flows through the fuel gas flow paths 77 of the dummy cells 112 is smaller than the pressure loss that occurs when the fuel gas flows through the fuel gas flow paths 77 of the fuel cells 12. Thus, the flow rate of the fuel gas flowing from the fuel gas supply path 74 into the fuel gas flow paths 77 of the dummy cells 112 is greater than the flow rate of fuel gas flowing from the fuel gas supply path 74 into the fuel gas flow paths 77 of the fuel cells 12.

Although omitted from illustration, a vapor-liquid separation device is provided upstream of the fuel gas supply path 74. Accordingly, water does not normally enter the fuel gas supply path 74. However, when high acceleration is applied to the fuel cell module 10 due to sudden acceleration or sudden deceleration of the fuel cell vehicle, water may flow into the fuel gas supply path 74 from the vapor-liquid separation device. Also, when the fuel cell vehicle is exposed to a low temperature environment for long periods of time, liquid water may be formed by condensation occurring in the fuel gas supply path 74. When the fuel gas flows through the fuel gas supply path 74 while the water is present in the fuel gas supply path 74, the water is carried downstream by the fuel gas. When the water carried downstream in this way flows into the fuel gas flow paths 77 of any of the fuel cells 12, the fuel gas flow paths 77 is blocked by the water, and the fuel cell 12 becomes unable to properly generate electricity. However, in the fuel cell module 10 of the present embodiment, inflow of water within the fuel gas supply path 74 into the fuel cell 12 is suppressed, which will be described below. That is to say, as described above, the pressure loss of the fuel gas flow paths 77 of the dummy cells 112 is smaller than the pressure loss of the fuel gas flow paths 77 of the fuel cells 12. Accordingly, the flow rate of the fuel gas in the fuel gas flow paths 77 of the dummy cells 112 is greater than the flow rate of the fuel gas in the fuel gas flow paths 77 of the fuel cells 12. Thus, the greater part of the water in the fuel gas supply path 74 flows into the fuel gas flow paths 77 of the dummy cells 112 in which the flow rate of the fuel gas is great. As a result, the inflow of water into the fuel gas flow paths 77 of the fuel cells 12 is suppressed. Consequently, the fuel gas flow paths 77 of the fuel cell 12 can be kept from being blocked by water, and electricity can be properly generated in the fuel cells 12.

Note that in the above-described embodiment, the air permeance of the spacer 120 is greater than the air permeance of the GDL 21, and the thickness of the spacer 120 is greater than the thickness of the GDL 21, and accordingly the pressure loss of the fuel gas flow paths 77 of the dummy cells 112 is smaller than the pressure loss of the fuel gas flow paths 77 of the fuel cells 12. However, as another configuration, the pressure loss of the fuel gas flow paths 77 of the dummy cells 112 may be smaller than the pressure loss of the fuel gas flow paths 77 of the fuel cells 12. For example, an arrangement may be made in which the depth of the grooves 44 of the dummy cells 112 is deeper than the depth of the grooves 44 of the fuel cells 12 such that the sectional area of the fuel gas flow paths 77 of the dummy cells 112 is greater than the sectional area of the fuel gas flow paths 77 of the fuel cells 12.

Also, in the above-described embodiment, the pressure loss of the fuel gas flow paths 77 of the dummy cells 112 is smaller than the pressure loss of the fuel gas flow paths 77 of the fuel cells 12. However, as another embodiment, the pressure loss of the oxidant gas flow paths 78 of the dummy cells 112 may be smaller than the pressure loss of the oxidant gas flow paths 78 of the fuel cells 12. According to this configuration, inflow of water from the oxidant gas supply path 71 into the oxidant gas flow paths 78 of the fuel cells 12 can be suppressed. Also, in another embodiment, the technology disclosed in the present specification may be applied to both the fuel gas flow paths and the oxidant gas flow paths.

Further, in the above-described embodiment, both the fuel gas and the oxidant gas flow in the dummy cells 112, but a configuration may be made in which only one of the fuel gas and the oxidant gas flows in the dummy cells 112.

Further, in the above-described embodiment, the dummy cells 112 are disposed at respective end portions of the stack 13 of fuel cells 12. However, the dummy cell 112 may be disposed at just one end portion of the stack 13.

The correspondence of the components of the above-described embodiment will be described. The fuel gas according to the embodiment is an example of a reactant gas. The fuel gas supply path 74 according to the embodiment is an example of a reactant gas supply path. The fuel gas discharge path 73 according to the embodiment is an example of a reactant gas discharge path. The fuel gas flow path 77 according to the embodiment is an example of a reactant gas flow path. The separator 40 of the dummy cell 112 according to the embodiment is an example of a first separator. The separator 50 of the dummy cell 112 according to the embodiment is an example of a second separator. The separator 40 of the fuel cell 12 according to the embodiment is an example of a third separator. The separator 50 of the fuel cell 12 according to the embodiment is an example of a fourth separator.

Although the embodiment has been described in detail above, these are only exemplary, and are not intended to limit the scope of claims. The technology set forth in the claims includes various modifications and variations of the specific examples exemplified above. The technical elements described in the specification or drawings exhibit technical utility alone or in various combinations, and are not limited to the combinations described in the claims at the time of application.

What is claimed is:

1. A fuel cell module, comprising:
   a stack including a plurality of fuel cells stacked together;
   at least one dummy cell in contact with the stack at an end portion of the stack in a stacking direction;
   a reactant gas supply path configured to supply a reactant gas that is either a fuel gas or an oxidant gas to the fuel cells and the dummy cell; and
   a reactant gas discharge path in communication with the fuel cells and the dummy cell,
   wherein the fuel cells and the dummy cell each include a reactant gas flow path configured to cause the reactant gas from the reactant gas supply path to flow toward the reactant gas discharge path, and
   wherein pressure loss of the reactant gas flow path of the dummy cell is smaller than pressure loss of the reactant gas flow path of the fuel cells.

2. The fuel cell module according to claim 1, wherein:
   the dummy cell includes a first separator, a second separator, and a spacer that has aeration properties and that is interposed between the first separator and the second separator; and
   the spacer is part of the reactant gas flow path of the dummy cell.

3. The fuel cell module according to claim 2, wherein:
   the fuel cells each include a third separator, a fourth separator, and a membrane electrode assembly interposed between the third separator and the fourth separator;
   the membrane electrode assembly includes a gas diffusion layer that has aeration properties, the gas diffusion layer is part of the reactant gas flow path of the fuel cells; and
   an air permeance of the spacer is higher than an air permeance of the gas diffusion layer.

4. The fuel cell module according to claim 3, wherein a sectional area of the reactant gas flow path of the dummy cell is greater than a sectional area of the reactant gas flow path of the fuel cells.

5. The fuel cell module according to claim 3, wherein a thickness of the spacer is greater than a thickness of the gas diffusion layer.

6. The fuel cell module according to claim 3, wherein:
   a groove is provided on a surface of each of the first separator, the second separator, the third separator, and the fourth separator;
   in the dummy cell, the reactant gas flow path is configured by the groove and the spacer;
   in the fuel cells, the reactant gas flow path is configured by the groove and the gas diffusion layer; and
   a depth of the groove of the dummy cell is deeper than a depth of the groove of the fuel cells.

* * * * *